US012608738B1

(12) United States Patent
Gopalakrishnan et al.

(10) Patent No.: US 12,608,738 B1
(45) Date of Patent: Apr. 21, 2026

(54) GENERATING VECTOR-BASED RECOMMENDATIONS

(71) Applicant: Oracle International Corporation, Redwood Shores, CA (US)

(72) Inventors: Venkatakrishnan Gopalakrishnan, Seattle, WA (US); May Bich Nhi Lam, San Jose, CA (US); Diego Ceferino Torres Dho, Barcelona (ES); Jan Sterba, Bratislava (SK)

(73) Assignee: Oracle International Corporation, Redwood Shores, CA (US)

( * ) Notice: Subject to any disclaimer, the term of this patent is extended or adjusted under 35 U.S.C. 154(b) by 149 days.

(21) Appl. No.: 18/403,529

(22) Filed: Jan. 3, 2024

(51) Int. Cl.
*G06F 16/00* (2019.01)
*G06N 5/022* (2023.01)
*G06Q 30/0601* (2023.01)

(52) U.S. Cl.
CPC ......... *G06Q 30/0631* (2013.01); *G06N 5/022* (2013.01)

(58) Field of Classification Search
CPC . G06F 16/00; G06Q 30/0631; G06Q 30/0601
See application file for complete search history.

(56) References Cited

U.S. PATENT DOCUMENTS

| | | | | |
|---|---|---|---|---|
| 11,232,110 B2 * | 1/2022 | Price | .................... | G06F 16/288 |
| 2014/0229476 A1 * | 8/2014 | Fouad | .................. | G06F 16/355 |
| | | | | 707/729 |
| 2025/0094504 A1 * | 3/2025 | Gopalakrishnan | ...... | G06F 16/93 |

* cited by examiner

*Primary Examiner* — Cheryl Lewis
(74) *Attorney, Agent, or Firm* — Invoke

(57) ABSTRACT

Techniques are described herein for performing generation of vector-based recommendations for entities. One or more embodiments address the challenge of generating recommendations for entities lacking sufficient recommendation generation input data. Unlike traditional collaborative filtering methods, various embodiments leverage content filtering techniques to make tailored and relevant recommendations for entities. By analyzing entity attributes and generating entity attribute vectors in an N-dimensional space, this system identifies the most suitable transactions by determining the closest neighbors in this space, thereby enhancing the accuracy and effectiveness of recommendations for entities associated with insufficient recommendation generation input data within the platform.

20 Claims, 8 Drawing Sheets

100

100

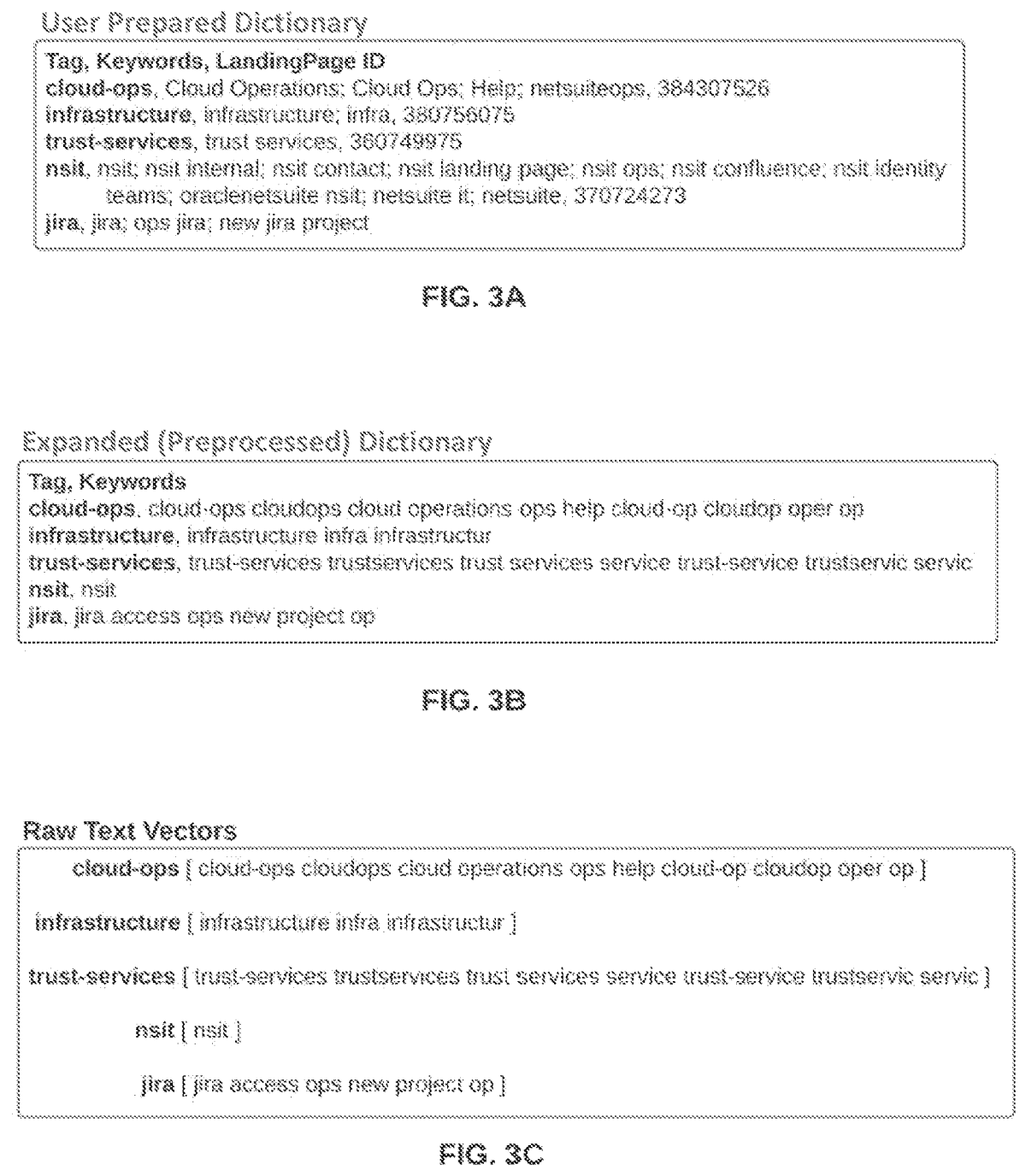

User Prepared Dictionary

Tag, Keywords, LandingPage ID
cloud-ops, Cloud Operations; Cloud Ops; Help; netsuiteops, 384307526
infrastructure, infrastructure; infra, 380756075
trust-services, trust services, 360749975
nsit, nsit; nsit internal; nsit contact; nsit landing page; nsit ops; nsit confluence; nsit identity
   teams; oraclenetsuite nsit; netsuite it; netsuite, 370724273
jira, jira; ops jira; new jira project

FIG. 3A

Expanded (Preprocessed) Dictionary

Tag, Keywords
cloud-ops, cloud-ops cloudops cloud operations ops help cloud-op cloudop oper op
infrastructure, infrastructure infra infrastructur
trust-services, trust-services trustservices trust services service trust-service trustservic servic
nsit, nsit
jira, jira access ops new project op

FIG. 3B

Raw Text Vectors cloud-ops [ cloud-ops cloudops cloud operations ops help cloud-op cloudop oper op ]

infrastructure [ infrastructure infra infrastructur ]

trust-services [ trust-services trustservices trust services service trust-service trustservic servic ]

nsit [ nsit ]

jira [ jira access ops new project op ]

FIG. 3C

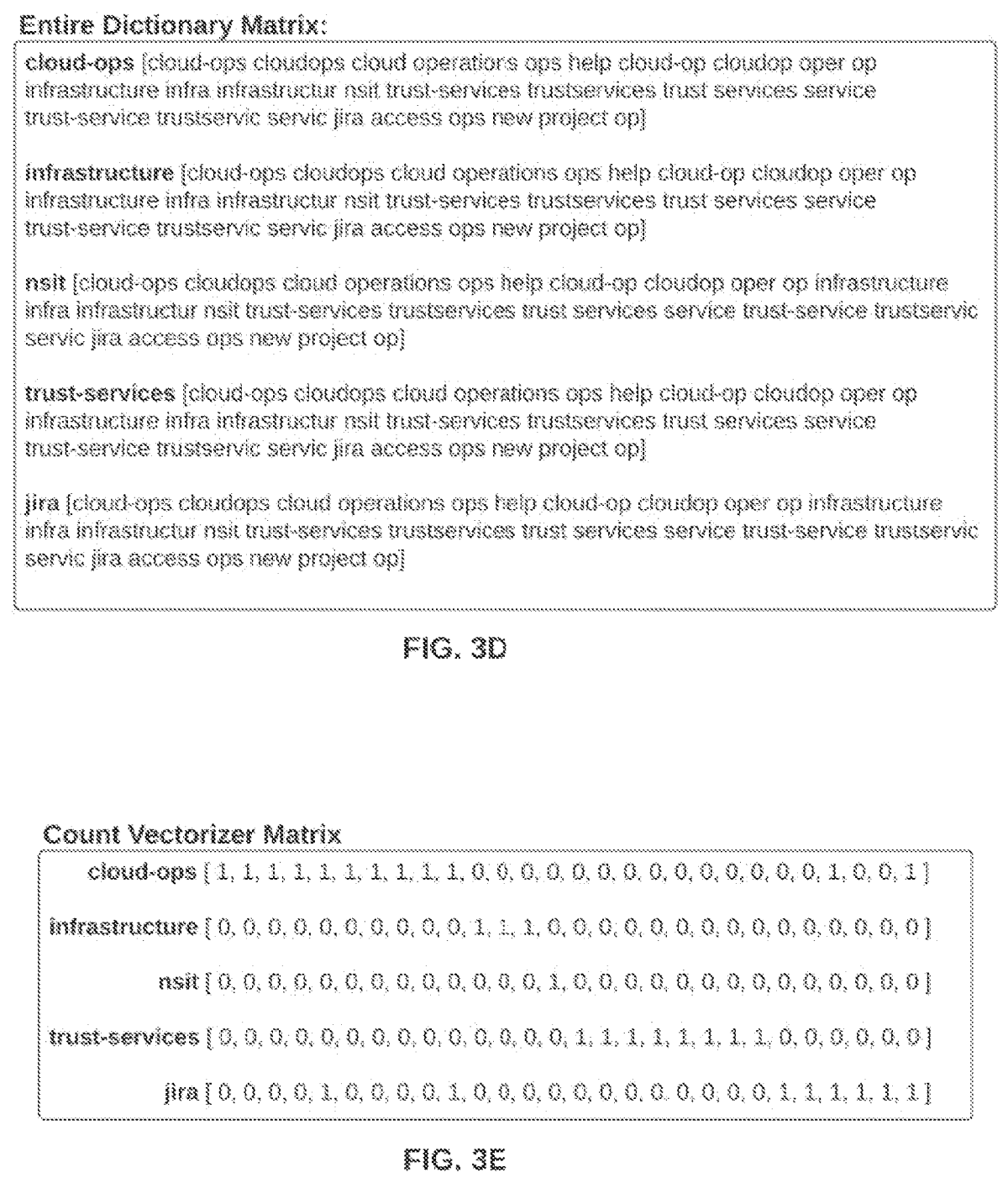

Entire Dictionary Matrix:

cloud-ops [cloud-ops cloudops cloud operations ops help cloud-op cloudop oper op infrastructure infra infrastructur nsit trust-services trustservices trust services service trust-service trustservic servic jira access ops new project op]

infrastructure [cloud-ops cloudops cloud operations ops help cloud-op cloudop oper op infrastructure infra infrastructur nsit trust-services trustservices trust services service trust-service trustservic servic jira access ops new project op]

nsit [cloud-ops cloudops cloud operations ops help cloud-op cloudop oper op infrastructure infra infrastructur nsit trust-services trustservices trust services service trust-service trustservic servic jira access ops new project op]

trust-services [cloud-ops cloudops cloud operations ops help cloud-op cloudop oper op infrastructure infra infrastructur nsit trust-services trustservices trust services service trust-service trustservic servic jira access ops new project op]

jira [cloud-ops cloudops cloud operations ops help cloud-op cloudop oper op infrastructure infra infrastructur nsit trust-services trustservices trust services service trust-service trustservic servic jira access ops new project op]

FIG. 3D

Count Vectorizer Matrix cloud-ops [ 1, 1, 1, 1, 1, 1, 1, 1, 1, 1, 0, 0, 0, 0, 0, 0, 0, 0, 0, 0, 0, 0, 0, 1, 0, 0, 1 ]

infrastructure [ 0, 0, 0, 0, 0, 0, 0, 0, 0, 0, 1, 1, 1, 0, 0, 0, 0, 0, 0, 0, 0, 0, 0, 0, 0, 0, 0 ]

nsit [ 0, 0, 0, 0, 0, 0, 0, 0, 0, 0, 0, 0, 0, 1, 0, 0, 0, 0, 0, 0, 0, 0, 0, 0, 0, 0, 0 ]

trust-services [ 0, 0, 0, 0, 0, 0, 0, 0, 0, 0, 0, 0, 0, 1, 1, 1, 1, 1, 1, 1, 1, 0, 0, 0, 0, 0 ]

jira [ 0, 0, 0, 0, 1, 0, 0, 0, 0, 1, 0, 0, 0, 0, 0, 0, 0, 0, 0, 0, 0, 0, 1, 1, 1, 1, 1, 1 ]

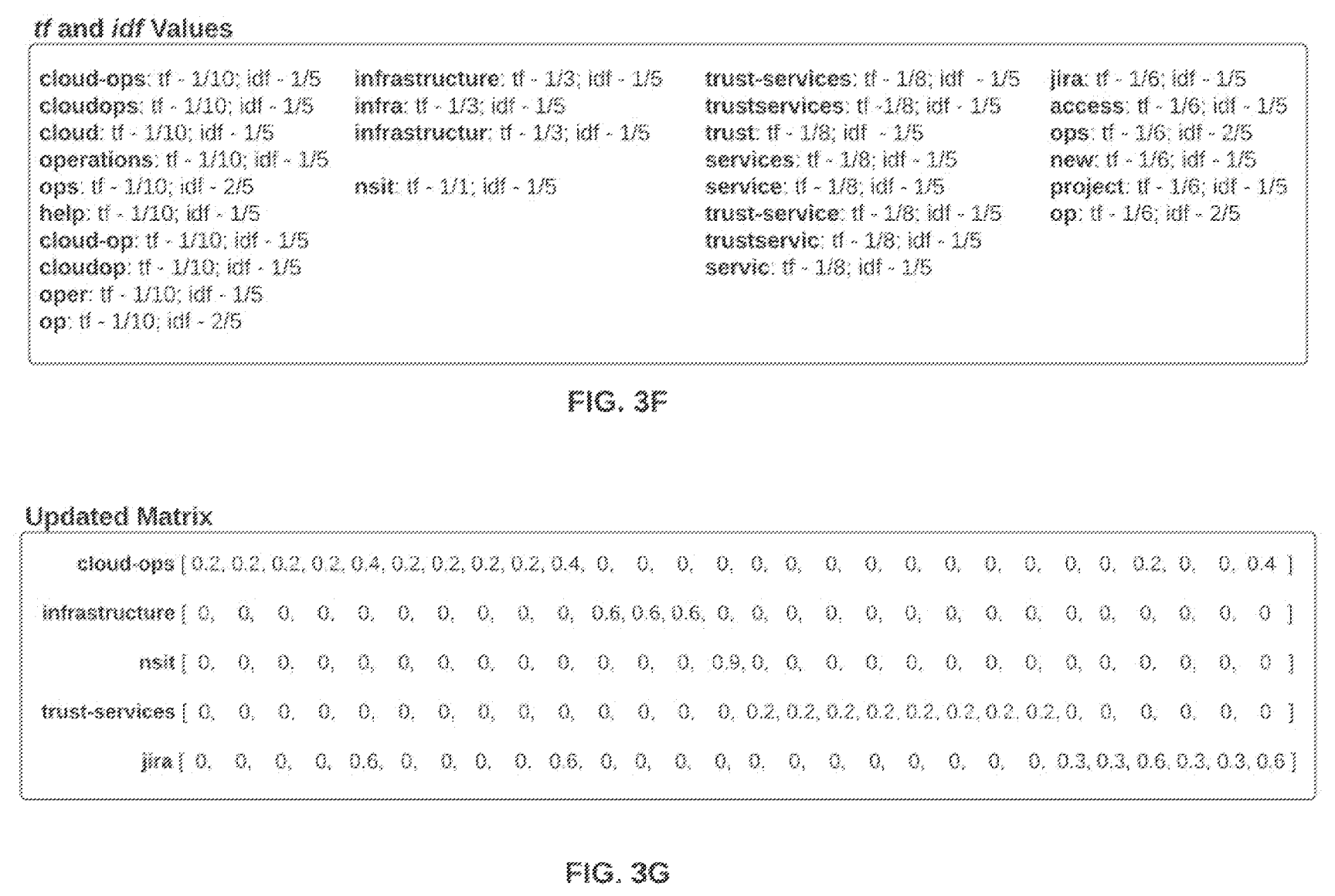

FIG. 3E tf and idf Values cloud-ops: tf - 1/10; idf - 1/5
cloudops: tf - 1/10; idf - 1/5
cloud: tf - 1/10; idf - 1/5
operations: tf - 1/10; idf - 1/5
ops: tf - 1/10; idf - 2/5
help: tf - 1/10; idf - 1/5
cloud-op: tf - 1/10; idf - 1/5
cloudop: tf - 1/10; idf - 1/5
oper: tf - 1/10; idf - 1/5
op: tf - 1/10; idf - 2/5 infrastructure: tf - 1/3; idf - 1/5
infra: tf - 1/3; idf - 1/5
infrastructur: tf - 1/3; idf - 1/5 nsit: tf - 1/1; idf - 1/5 trust-services: tf - 1/8; idf - 1/5
trustservices: tf - 1/8; idf - 1/5
trust: tf - 1/8; idf - 1/5
services: tf - 1/8; idf - 1/5
service: tf - 1/8; idf - 1/5
trust-service: tf - 1/8; idf - 1/5
trustservic: tf - 1/8; idf - 1/5
servic: tf - 1/8; idf - 1/5 jira: tf - 1/6; idf - 1/5
access: tf - 1/6; idf - 1/5
ops: tf - 1/6; idf - 2/5
new: tf - 1/6; idf - 1/5
project: tf - 1/6; idf - 1/5
op: tf - 1/6; idf - 2/5

FIG. 3F

Updated Matrix cloud-ops [ 0.2, 0.2, 0.2, 0.2, 0.4, 0.2, 0.2, 0.2, 0.2, 0.4, 0, 0, 0, 0, 0.6, 0.6, 0.6, 0, 0, 0, 0, 0, 0, 0, 0, 0, 0, 0, 0, 0, 0, 0, 0.2, 0, 0.2, 0, 0, 0.04 ]

infrastructure [ 0, 0, 0, 0, 0, 0, 0, 0, 0, 0, 0.6, 0.6, 0.6, 0, 0, 0, 0, 0, 0, 0, 0, 0, 0, 0, 0, 0, 0, 0, 0, 0, 0, 0, 0, 0, 0, 0, 0, 0 ]

nsit [ 0, 0, 0, 0, 0, 0, 0, 0, 0, 0, 0, 0, 0, 0.9, 0, 0, 0, 0, 0, 0, 0, 0, 0, 0, 0, 0, 0, 0, 0, 0, 0, 0, 0, 0, 0, 0, 0, 0 ]

trust-services [ 0, 0, 0, 0.6, 0, 0, 0, 0, 0, 0, 0, 0, 0, 0, 0.2, 0.2, 0.2, 0.2, 0.2, 0.2, 0, 0, 0, 0, 0, 0, 0, 0, 0, 0, 0, 0, 0, 0, 0, 0, 0, 0 ]

jira [ 0, 0, 0, 0, 0, 0, 0, 0.6, 0, 0, 0, 0, 0, 0, 0, 0, 0, 0, 0, 0, 0, 0, 0.3, 0.3, 0.6, 0.3, 0.3, 0.6 ]

Receive a new customer, "Customer5"

412

Generate entity attribute vectors for "Customer5" and a set of existing customers

414

Identify a closest neighbor "Customer2" for "Customer5"

416

Identify recommendation data for "Customer2"

418

Generate a recommendation for "Customer5" based on the recommendation data for "Customer2"

GENERATING VECTOR-BASED RECOMMENDATIONS

TECHNICAL FIELD

The present disclosure relates to recommendation systems. In particular, the present disclosure relates to generating vector-based recommendations for entities.

BACKGROUND

Recommendation systems have become integral components of many online platforms. These systems are designed to provide recommendations for users based on the user's preferences and/or behaviors. For example, a vendor may generate a purchase recommendation for a user based on the user's past purchases. Some systems also include information from other users when generating recommendations for a user. For example, a vendor may identify a user as being within the 40-50 year old age bracket. The vendor may generate a recommendation for the user based on popular purchases among other 40-50 year olds.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3G illustrate an example embodiment of generating entity attribute vectors;

DETAILED DESCRIPTION

Figure 1:
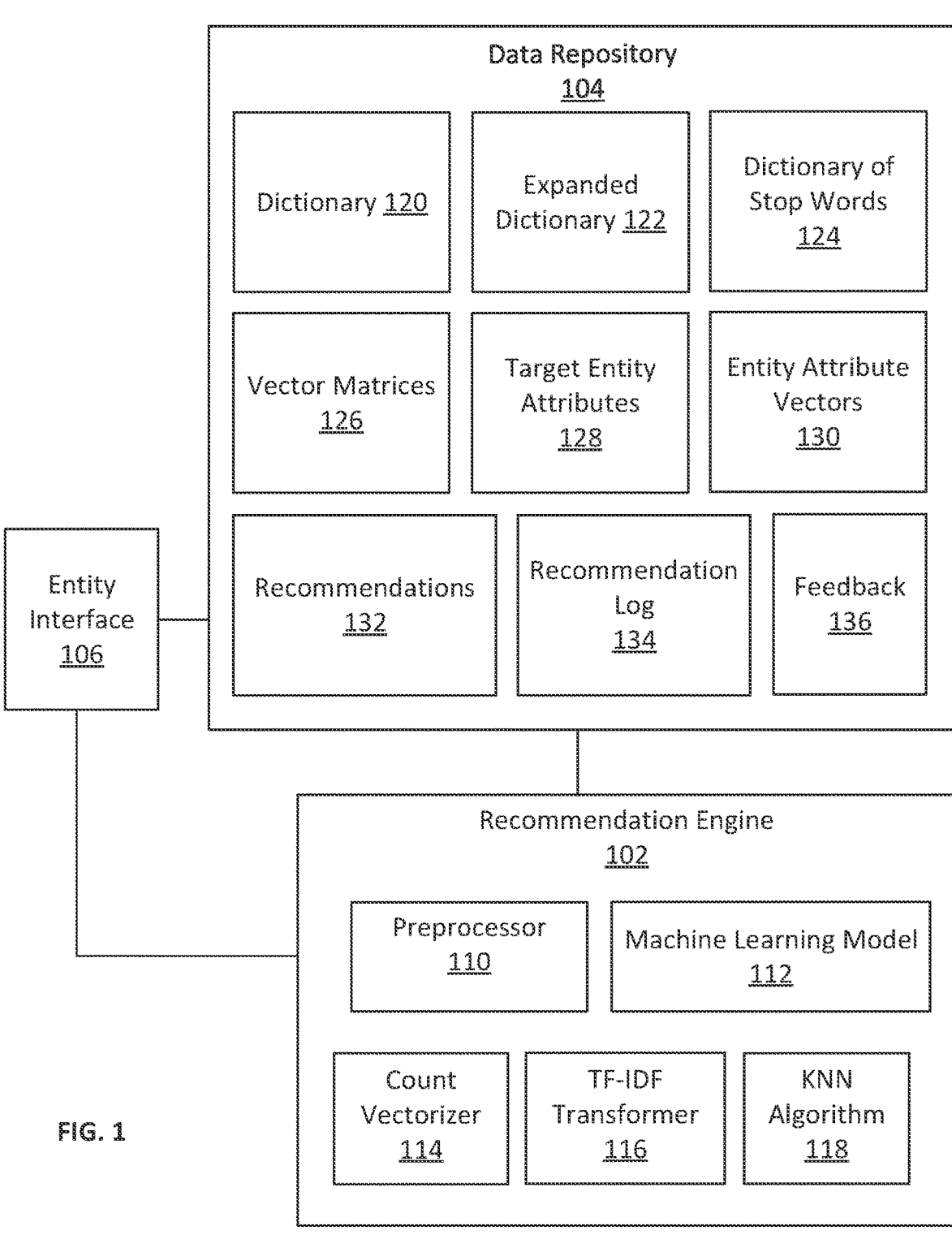
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. GENERAL OVERVIEW
2. RECOMMENDATION ENGINE SYSTEM ARCHITECTURE

3. GENERATING VECTOR-BASED RECOMMENDATIONS
4. GENERATING ENTITY ATTRIBUTE VECTORS
5. EXAMPLE EMBODIMENT OF GENERATING ENTITY ATTRIBUTE VECTORS
6. EXAMPLE EMBODIMENT FOR GENERATING A VECTOR-BASED RECOMMENDATION
7. HARDWARE OVERVIEW
8. MISCELLANEOUS; EXTENSIONS

1. General Overview

One or more embodiments generate vector-based recommendations for entities that lack other recommendation-generation data upon which a system may generate a recommendation. The system represents a set of entities with a set of vectors. The vectors include feature sets representing characteristics of the entities. One vector represents the entity (e.g., a target entity) for which the system lacks sufficient recommendation data. Other vectors represent entities for which the system has recommendation data. The system infers recommendation data for the target entity based on identifying one or more of the other entities that correspond to vectors closest to the target entity's vector in an n-dimensional space.

One or more embodiments generate a set of entity attribute vectors associated with a corresponding set of entities by aggregating the entity attributes for each entity in the set of entities to generate a dictionary of entity attributes. The system encodes the entity attributes as vectors based on a term frequency (tf) that is indicative of the number of terms in the set of entity attributes. The encoding is further based on an inverse document frequency (idf) that is indicative of a number of occurrences of the entity attributes, from the set of entity attributes, in the dictionary of entity attributes.

For example, a system may receive a request to generate a product recommendation for a new customer. However, the new customer may not have any purchase history on which to base a recommendation. The system obtains information from the new customer's profile. If the new customer is an individual, the information may include, for example, customer location, age, gender, occupation, salary, hobbies, interests, skills, and education. If the new customer is a business, information may include, for example, location, industry type, goods or services that the customer provides, size (e.g., number of employees and/or estimated revenue), corporate structure, a growth rate, etc. The information may exclude a transaction history since the new customer does not have a transaction history. Alternatively, the information may include some transaction history, but the system may determine that the transaction history data is insufficient to generate an effective recommendation. Based on determining the new customer has insufficient transaction history to generate an effective recommendation, the system generates an entity attribute vector representing the new customer based on the information associated with the new customer. The system also generates a set of entity attribute vectors for a set of additional customers. The system may select the additional customers for generating entity attribute vectors based on determining the system has access to transaction history information for the additional customers. The entity attribute vectors for the new customer and the additional customers all include entity attributes for both the new customer and the additional customers. The system compares the new customer's entity attribute vector to entity attribute vectors of the additional customers with known transaction histories. The system identifies a nearest entity attribute vector to the new customer's vector. The system identifies a transaction history associated with the nearest vector to the new customer's vector. The system generates a product recommendation for the new customer based on a purchase history of the customer that corresponds to the nearest vector to the new customer's vector.

In one or more alternative embodiments, the aggregated set of entity attributes is generated from a set of entities that does not include the target entity. The system identifies an existing entity attribute vector that most closely matches the entity attribute vector, i.e., the entity for which the recommendation system aims to generate personalized recommendations.

One or more embodiments described in this Specification and/or recited in the claims may not be included in this General Overview section.

2. Recommendation Engine System Overview

FIG. 1 illustrates a system 100 in accordance with one or more embodiments. As illustrated in FIG. 1, the system 100 includes a recommendation engine 102, a data repository 104, and an entity interface 106. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the recommendation engine 102 refers to hardware and/or software configured to perform operations described herein for generating vector-based recommendations for entities. Examples of operations for generating vector-based recommendations for entities are described below with reference to FIGS. 2A and 2B.

In one or more embodiments, the recommendation engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the system 100 includes a recommendation engine 102 for generating recommendations for entities. The recommendation engine 102 receives an index of key value pairs for a set of existing entities. In one or more embodiments, the key value pairs include an entity and a set of one or more entity attributes corresponding to the entity. In one or more embodiments, the recommendation engine 102 includes a preprocessor 110 for transforming sets of one or more candidate entity attributes into usable text for processing.

The recommendation engine 102 receives entity data for a target entity that is separate from the existing entities. The entity data includes a set of one or more entity attributes 128 associated with the target entity. The recommendation engine 102 preprocesses the one or more entity attributes to prepare the set of entity attributes 128 for processing. The recommendation engine 102 generates a dictionary 120 that includes the following: (a) a set of entity attributes corresponding to the target entity, and (b) a set of entity attributes corresponding to the set of existing entities. Using the dictionary 120, the recommendation engine 102 generates, for each entity, a corresponding entity attribute vector. In one or more embodiments, each entity attribute vector includes features corresponding to each other entity, including the target entity. The recommendation engine 102 compares the entity attribute vector 130 for the target entity to the entity attribute vectors corresponding to the existing entities to identify the closest entity attribute vector to the entity attribute vector 130 for the target entity.

In one or more embodiments, the preprocessor 110 of the recommendation engine 102 is a software tool or component that performs various transformations on the entity attributes in the dictionary 120. The preprocessor 110 performs some processes on the entity attributes individually. The preprocessor 110 performs other processes on sets of two or more entity attributes associated with each entity. The preprocessor 110 prepares the entity attributes in the dictionary 120 for further use within the system. The preprocessor 110 may generate an expanded dictionary 122 by (a) deleting duplicate words within each set of entity attributes, (b) converting the possible entity attributes to lowercase, (c) cleaning up special characters from the entity attributes, (d) removing stop words from the entity attributes, (e) lemmatizing the entity attributes and/or (f) stemming the possible entity attributes.

In one or more embodiments, converting entity attributes to lowercase letters ensures uniformity and consistency. Some embodiments convert all words to lowercase to assist in normalizing the text by eliminating the distinction between entity attributes that are capitalized and entity attributes that are not capitalized. Capitalization variations can lead to inconsistency when comparing or processing text. The entity attributes may be converted to lowercase letters to ensure that the same entity attribute in different forms, e.g., "Apple," "apple," and "APPLE", is treated as the same entity attribute. In one or more embodiments, where capitalization is used for emphasis or to convey additional information, lowercasing removes this noise.

In one or more embodiments, cleaning up special characters from the possible entity attributes includes addressing special characters, symbols, punctuation, and other non-alphanumeric characters. The non-alphanumeric characters may not always carry meaningful information and can potentially interfere with modeling. Special characters may be cleaned up by removing punctuation marks, such as commas, periods, question marks, and exclamation points. Special characters may be cleaned up by replacing contractions to assist in maintaining the integrity of the possible entity attributes during analysis, e.g., expanding contractions like "don't" to "do not" and "it's" to "it is." Some embodiments remove non-alphanumeric characters that are neither letters nor numbers, including, symbols, emojis, and other non-ASCII characters. Some embodiments normalize accents and diacritics by converting accented characters and diacritics to their base form, e.g., "résumé" is normalized to "resume." Some embodiments replace special characters with spaces, e.g., replace special characters with spaces or other placeholders, to separate entity attributes that may have been concatenated with special characters. Some embodiments normalize Unicode characters to a standard form to handle different character representations. Regular expressions may be used to match and replace specific patterns of special characters. Some embodiments include custom cleaning rules to address special character patterns.

One or more embodiments delete duplicate entity attributes within a set of entity attributes for each entity. In one or more embodiments, removing duplicate words prevents distortion of entity attribute frequency calculations. In one or more embodiments, entity attributes are associated with more than one entity. As will be described in further detail below, the appearance of the same entity attribute in entity data associated with more than one entity affects the inverse document frequency (idf) value of the entity attribute.

In one or more embodiments, stop words are common words that are considered to be of little value in terms of conveying meaningful information. Consequently, the pre-processor 110 filters out stop words. Stop words are generally common words that appear frequently across different documents or texts, and may not carry significant semantic meaning on their own. Examples of stop words in English include words like "the", "and", "is", "of", "in", "to", "it", and "that". In one or more embodiments, a dictionary of stop words 124 is maintained in the data repository 104 for use by the recommendation engine 102.

One or more embodiments utilize lemmatization, a normalization technique, to reduce the entity attributes to their base or dictionary form, known as a "lemma." The lemma represents the canonical, or base, form of a word, and lemmatization includes removing inflections and variations to convert entity attributes to their common root form. Lemmatization groups together different inflected forms of an entity attribute, so the entity attributes can be analyzed as a single item. Lemmatization assists in improving the accuracy and efficiency of text analysis tasks by reducing the number of unique entity attributes while preserving the core meaning of the text. For example, the lemma of the words "running," "runs," and "ran" is "run." Similarly, "better" and "best" have the lemma "good." The aim of lemmatization is to preserve the contextual meaning of words. In one or more embodiments, lemmatization accounts for the part of speech (POS) of the entity attribute. For example, the lemma of "better" as an adjective would be "good," while its lemma as a verb might be "better." One or more embodiments rely on linguistic databases (lexicons) and morphological rules to determine the correct lemma for a given word and its context. Libraries such as Natural Language Toolkit (NLTK) and spaCy may be used to provide lemmatization capabilities for various languages. In one or more embodiments, lemmatization enhances the accuracy of text analysis tasks by reducing word variations.

One or more embodiments use stemming, a text normalization technique, to reduce the entity attributes to their base or root form, known as a "stem". The stem represents the core part of an entity attribute to which prefixes and suffixes are removed. Stemming simplifies entity attributes to their common base form, allowing entity attributes with similar meanings to be treated as the same word. For example, the stem of the words "running," "runs," and "ran" is "run." Similarly, "jumping," "jumps," and "jumped" have the stem "jump." Stemming is computationally less intensive than other text normalization techniques like lemmatization. Stemming algorithms are available for different languages and are implemented in various NLP libraries. The Porter stemming algorithm and the Snowball stemmer are used for English stemming.

In one or more embodiments, the recommendation engine 112 generates a recommendation for a new entity by applying a machine learning model 112 to a set of attribute data associated with the new entity. The machine learning model 112 represents one or more mathematical representations or algorithmic structures that can learn patterns, relationships, or behaviors from the expanded dictionary 122 and generate a recommendation for the new entity based on that learned knowledge.

In one or more embodiments, the recommendation engine 102 trains the machine learning model 112 based on a machine learning algorithm. A machine learning algorithm is an algorithm that can be iterated to train a target model f that best maps a set of input variables to an output variable, using a set of training data. For example, the machine learning algorithm may train a target model that maps a set of entity attribute data to a transaction recommendation. The training data includes datasets and associated labels. The datasets are associated with input variables for the target model f. The associated labels are associated with the output variable of the target model f. For example, the input variables may correspond to entity attributes. The output variables may include transactions associated with the entities. The training data may be updated based on, for example, feedback on the predictions by the target model/ and accuracy of the current target model f. Updated training data is fed back into the machine learning algorithm, which in turn updates the target model f.

A machine learning algorithm 112 generates a target model/such that the target model f best fits the datasets of training data to the labels of the training data. Additionally, or alternatively, a machine learning algorithm 112 generates a target model f such that when the target model f is applied to the datasets of the training data, a maximum number of results determined by the target model f matches the labels of the training data. Different target models are generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a count vectorizer 114 converts an entity attribute vector into a numerical vector, a tf-idf transformer for providing an updated numerical representation of the entity attributes in the count vector, and a KNN algorithm 118 for determining a closest neighbor to the new entity attribute vector 130.

In one or more embodiments, the count vectorizer 114 transforms the matrix of raw text, e.g., entire dictionary matrix, into a matrix of numeric vectors, e.g., entity attribute vectors, with each entity attribute vector being associated with an entity. In one or more embodiments, the count vectorizer 114 prepares the raw text data for further processing by other algorithms. In one or more embodiments, the raw text data is further processed by the machine learning model 112.

In one or more embodiments, the count vectorizer 114 creates a vector for each set of one or more entity attributes associated with the existing entities and the new entity. The count vectorizer 114 generates a raw text vector for each of one or more entity attributes in the expanded dictionary 122 associated with each of the entities. Then, the count vectorizer 114 aggregates all the entity attributes in the raw text vector for each of the entities into an entire dictionary vector. In one or more embodiments, the order of the entity attributes in the entire dictionary vector is determined by the count vectorizer 114. In some embodiments, an entire dictionary vector is generated for each entity to form an entire dictionary matrix. See, for example, FIG. 3D. In one or more embodiments, the number of locations, i.e., dimensions, within each entire dictionary vector is equal to the aggregate number of entity attributes for all the entities.

In one or more embodiments, the count vectorizer 114 replaces each of the entity attributes in the entire dictionary vector, i.e., row, associated with each entity with a "1" or a "0". In one or more embodiments, when the location in the entire dictionary vector for a particular entity corresponds to an entity attribute that is associated with the particular entity, a "1" is placed in that location. In one or more embodiments, when the location in the entire dictionary vector for the particular entity corresponds to an entity attribute that is not associated with the particular entity, a "0" is placed in that location. For example, in the count vectorizer matrix illustrated in FIG. 3E, in the 28 dimensional vector for the entity "infrastructure", a "1" is placed in the 11th, 12th, and 13th locations. The 11th, 12th, and 13th locations correspond to the entity attributes "infrastructure", "infra", and "infrastructur", and each of these entity attributes is associated with the entity "infrastructure". A "0" is placed in each of the other locations in the 28 dimensional vector for the entity "infrastructure" as each of the other locations correspond to entity attributes that are not associated with the entity "infrastructure".

In one or more embodiments, the count vectorizer 114 converts the entire dictionary vector for each of the entities into a numerical vector representing each of the entity attributes for the respective entities in the vectors. The result of processing the entire dictionary matrix by the count vectorizer 114 is a matrix where the rows correspond to entities in the expanded dictionary 122, the columns correspond to the entity attributes in the expanded dictionary 122, and the "1" or "0" in each location identifies whether or not the entity attribute corresponding to that location is associated with the respective entity. In one or more embodiments, the resulting matrix is a sparse matrix as most entities contain only a subset of the entity attributes. The matrix represents the entity attributes in a numerical format suitable for further processing.

In one or more embodiments, the tf-idf transformer 116 is an algorithm used to calculate the term frequency-inverse document frequency (tf-idf) value for each of the entity attributes in the expanded dictionary 122. The tf-idf values are used to measure the importance of an entity attribute in an entity relative to the importance of the same entity attribute in other entities. In one or more embodiments, tf is a numerical representation of an entity attribute in an entity, and idf is a numerical representation of the entity attribute in all the entities. Methods for calculating tf values and idf values and for combining the values vary. In one or more embodiments, the particular method used to calculate the tf values and idf values for the entity attributes and for combining the values is not important as long as the same method is applied consistently to all of the entity attributes. For example, the combined tf-idf value may be represented as tf*idf or tf lidf. In one or more embodiments, the tf is used for normalization. In other embodiments, the logarithm of the idf value is used for normalization. In one or more embodiments, the aim of calculating the tf-idf value is to transform the "1's" in the entity attribute vectors into decimals without losing the context of the data.

In one or more embodiments, the tf-idf transformer 116 operates by calculating the term frequency (tf) value for each entity attribute in an entity. In one or more embodiments, the tf value for an entity attribute is the number of times the entity attribute appears in the set of entity attributes associated with the entity. In one or more embodiments, this number is divided by the number of entity attributes within the set of entity attributes associated with the entity. In one or more embodiments, the tf-idf transformer 116 calculates the inverse document frequency (idf) value for each entity attribute within the vector for the entity. In one or more embodiments, the idf value for an entity attribute is the number of entities that contain the entity attribute over the number of entities in the document. The idf value for an entity attribute may be the logarithm of the number of entities in the document over the number of entities that contain the entity attribute.

In one or more embodiments, the K-Nearest Neighbors (KNN) algorithm 118 functions to identify the K closest, i.e., most similar, entity attribute vectors to a target vector. For example, the KNN algorithm 118 may identify three entity attribute vectors corresponding to existing entities that are closest to an entity attribute vector corresponding to a new entity. The recommendation engine 102 may analyze transaction data for the three entity attribute vectors to generate a transaction recommendation for the new entity.

In one or more embodiments, the KNN algorithm 118 determines an entity for a target entity attribute by taking the target vector created for the target entity attribute and comparing the target vector to the entity attribute vectors associated with each of the entities. In one or more embodiments, each entity is represented as a vector in a multidimensional space, where each entity attribute represents a dimension. In one or more embodiments, the KNN algorithm 118 compares the entity attribute vector 130 to the entity attribute vectors for the entity by plotting the entity attribute vector 130 relative to the entity attribute vectors and identifies the closest entity attribute vector to the target vector. In one or more embodiments, the KNN algorithm 118 measures the distance (similarity) between the entity attribute vector 130 and each of the entity attribute vectors using a distance metric (e.g., Euclidean or Manhattan). In one or more embodiments, the KNN algorithm 118 identifies the closest entity attribute vector (neighbor) to the entity attribute vector 130 based on the calculated distances.

In one or more embodiments, the entity attribute vector 130 and the entity attribute vector for the entity determined to be the closest neighbor require a similarity score within a threshold to be considered the closest match. For example, the threshold may be set to 80 percent. In one or more embodiments, when no entity attribute vector is within the threshold score, the KNN algorithm 118 indicates that no entity attribute vector was close enough to be considered a match to the entity attribute vector. According to an alternative embodiment, the system may not require a closest neighbor to meet any similarity score threshold.

In one or more embodiments, the recommendation engine 102 generates a recommendation 132 using the entity determined to be the closest neighbor to the target entity. This process involves the system determining an entity whose attribute vector exhibits the highest degree of similarity to the target entity's attribute vector. The recommendation is thereby tailored to align with the preferences and characteristics encapsulated in the identified closest entity, ensuring a customized and contextually relevant suggestion for the target entity.

In one or more embodiments, a data repository 104 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, the data repository 104 may be implemented or executed on the same computing system as the recommendation engine 102. Alternatively, or in addition, a data repository 104 may be implemented or executed on a computing system separate from the recommendation engine 102. The data repository 104 may be communicatively coupled to the recommendation engine 102 and the entity interface 106 via a direct connection or via a network.

Information describing the dictionary 120, the expanded dictionary 122, the dictionary of stop words 124, the vector matrices 126, the entity attributes 128, the entity attribute vector 130, the recommendations 132, the recommendation log 134, and the feedback 136 may be implemented across any of components within the system 100. However, this information is illustrated within the data repository 104 for purposes of clarity and explanation.

In one or more embodiments, and as noted above, the dictionary 120 is an index of key value pairs including entities and a set of one or more possible entity attributes associated with each entity. The possible entity attributes may include special characters, capitalized letters, and/or stop words. In one or more embodiments, the dictionary 120 is a text file. The dictionary 120 may be an entity-prepared document. In one or more alternative embodiments, the dictionary 120 is prepared using one or more machine learning models. The dictionary 120 may be in a JSON format.

In one or more embodiments, the expanded dictionary 122 is the dictionary 120 subsequent to preprocessing. As described in detail above, preprocessing may include one or more of (a) deleting duplicate words within each set of entity attributes, (b) converting the entity attributes to lowercase, (c) cleaning up special characters from the entity attributes, (d) removing stop words from the possible entity attributes, (c) lemmatizing the entity attributes, and/or (f) stemming the entity attributes.

In one or more embodiments, the dictionary of stop words 124 is a document containing words considered to be of little value in terms of conveying meaningful information. Stop words may therefore be filtered out. Stop words are common words that appear frequently across different documents or texts, and they may not carry significant semantic meaning on their own. Examples of stop words in English include words like "the", "and", "is", "of", "in", "to", "it", and "that". In one or more embodiments, the dictionary of stop words 124 is entity created. The dictionary of stop words 124 may include custom stop words particular to an application or use.

In one or more embodiments, the vector matrices 126 include the entire dictionary matrix generated from the aggregate of the entity attributes associated with each of the entities, the count vectorizer matrix generated by the count vectorizer 114 from the entire dictionary matrix, and the updated matrix generated by replacing the "1's" in the count vectorize matrix with the tf-idf values corresponding to the entity attributes in the identified locations.

In one or more embodiments, the entity attributes 128 refer to characteristics associated with entities. These attributes encompass various characteristics defining an entity, but exclude recommendation-generation data. For example, if the recommendation engine 102 is configured to generate a transaction recommendation for a new entity based on historical transaction data for the entity, the entity attributes 128 for the new entity may encompass one or more details such as the entity's name and industry. The entity attributes 128 exclude historical transaction data.

In one or more embodiments, the entity attribute vectors 130 are vectors generated from the entity attributes 128.

In one or more embodiments, the recommendations 132 are generated by the recommendation engine 102. In one or more embodiments, the recommendation 132 identifies one or more of the target entities identified by the recommendation engine 102 or a landing page ID identified for the entity predicted by the recommendation engine 102. The enhanced recommendation 132 may also include the target entity attributes 128.

In one or more embodiments, the recommendation log 134 in the data repository 104 is a log of recommendations generated using the recommendation engine 102. The fields may include, e.g., a timestamp, an entity ID, and/or one or more recommendations.

In one or more embodiments, the feedback 136 includes input, opinions, comments, and/or suggestions provided by entities of the recommendation engine 102. In various embodiments, feedback may be provided by the entity through, for example, surveys, feedback forms, comments, and email. Feedback may be related to (a) the number of recommendations generated, (b) the relevancy of the recommendations, (c) the length of time the recommendation engine required to generate the recommendations, e.g., latency, (d) the presentation of the recommendations, and/or (c) the inability to provide recommendations, if applicable. In one or more embodiments, the feedback may be with regards to (a) the overall operation and performance of the recommendation engine 102 and/or (b) individual recommendations generated and presented by the recommendation engine 102. For example, an entity may identify one or more recommendations as being irrelevant, or the entity may express frustration at the length of time required to present recommendations or frustration at the number of recommendations presented by the recommendation engine-too many or too few.

In one or more embodiments, the feedback 136 is used when considering if and how to retrain a machine learning model 112. For example, the dictionary 122 may be updated to include an entity attribute for one or more entities that was not previously used, or the threshold for determining similarity of the closest entity attribute vector may be adjusted. In one or more embodiments, one or more of the processes performed by the machining learning models are added or taken away. In one or more embodiments, the preprocessing techniques are adjusted to be more inclusive or less inclusive.

In one or more embodiments, the entity interface 106 refers to hardware and/or software configured to facilitate communications between an entity and recommendation engine 102. The entity interface 106 renders entity interface elements and receives input via entity interface elements. Examples of interfaces include a graphical entity interface (GUI), a command line interface (CLI), a haptic interface, and a voice command interface. Examples of entity interface elements include checkboxes, radio buttons, dropdown lists, list boxes, buttons, toggles, text fields, date and time selectors, command lines, sliders, pages, and forms.

In an embodiment, different components of entity interface 106 are specified in different languages. The behavior of entity interface elements is specified in a dynamic programming language, such as JavaScript. The content of entity interface elements is specified in a markup language, such as hypertext markup language (HTML) or XML Entity Interface Language (XUL). The layout of entity interface elements is specified in a style sheet language, such as Cascading Style Sheets (CSS). Alternatively, entity interface 106 is specified in one or more other languages, such as Java, C, or C++.

3. Generating Vector-Based Recommendations

Figure 2A:
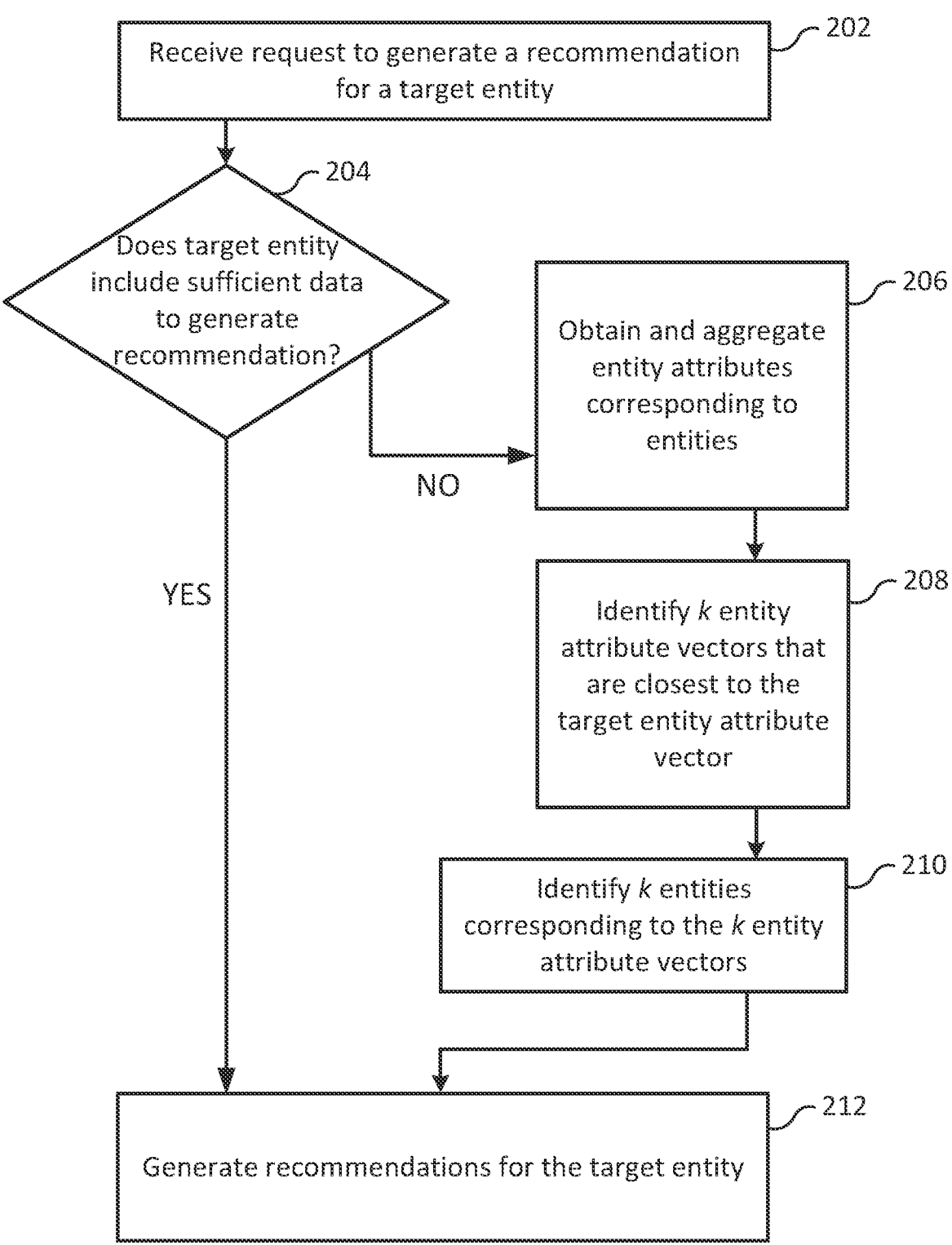
FIG. 2A illustrates an example set of operations for generating recommendations for an entity in accordance with one or more embodiments.

FIG. 2A illustrates an example set of operations for generating vector-based recommendations for entities in a recommendation system, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

A system receives a request to generate a recommendation for a target entity (Operation 202). For example, the system may determine that a new entity is associated with a platform. The platform may be configured to provide goods, services, or operations for entities accessing the platform. As an example, a vendor may receive a request to generate a transaction recommendation for a new customer.

The system determines whether a set of entity data for the target entity includes sufficient recommendation generation input data to generate the recommendation (Operation 204). For example, a platform may provide online services to customers. The platform may generate recommendations for services for customers based on the services the customers have previously used or purchased. If a customer has a history of using or purchasing services, the system may determine that the set of entity data for the target entity is sufficient to generate a recommendation. On the other hand, if the target entity is a new customer without any history of using or purchasing services, the system may determine that a set of entity data does not include sufficient recommendation generation input data (e.g., historical use/purchase of services) for generating a recommendation. In one example embodiment, the criteria for determining that the set of entity data includes sufficient recommendation generation input data is a value greater than zero. For example, in the embodiment in which a platform provides services, the platform may be configured to generate recommendations based on a user history including two or more purchases of services. If the system determines that customer has made only one purchase of a service, the system may determine that the set of entity data does not include sufficient recommendation generation input data to generate a recommendation.

If the system determines that the set of entity data does not include sufficient recommendation generation input data to generate the recommendation, then the system initiates a process to generate a recommendation based on a vector-based similarity with at least one other entity. For example, an entity labeled "cloud-ops" may have extensive historical transaction data, capturing various customer preferences and purchase patterns for different services. The system determines that the entity data for this entity includes sufficient recommendation generation input data. In contrast, another entity labeled "jira" may have no historical transaction data available. In this case, the system determines the set of data for "jira" to be insufficient input data for recommendation generation. Alternatively, the entity labeled "jira" may have only one historical transaction recorded. The system may require three or more historical transactions as input data to generate a recommendation. Accordingly, the system determines that the entity "jira" lacks sufficient recommendation data to generate a recommendation for a transaction.

The system obtains entity attributes corresponding to a set of entities, including the target entity and a set of additional entities. The set of additional entities correspond to sets of entity data that include recommendation generation input data. For example, in the example embodiment in which a platform generates recommendations based on historical service usage data, the set of additional entities include historical service usage data. The system generates a set of entity attribute vectors based on the entity attributes for the target entity and the set of additional entities (Operation 206). Operations for generating the set of entity attribute vectors are described in further detail in FIG. 2B, below.

The system identifies at least one entity attribute vector from among the set of entity attribute vectors that is closest to an entity attribute vector corresponding to the target entity (Operation 208). For example, the system may map a set of entity attribute vectors including the entity attribute vector and a set of additional entity attribute vectors in n-dimensional space, where n is a number of features in each of the entity attribute vectors. The system may identify k entity attribute vectors that are closest to the entity attribute vector in the n dimensional space. For example, the system may determine a proximity of entity attribute vectors to each other using a mathematical algorithm such as, a Euclidean distance, a Manhattan distance, a Minkowski distance, a cosine similarity value, or another distance metric . . . . In addition, or in the alternative, the system may utilize a K-nearest neighbor (KNN) type algorithm to identify a number, k, entity attribute vectors that are nearest to the entity attribute vector. The system identifies at least one entity associated with at least one entity attribute vector system identifies k entities corresponding to the k entity attribute vectors (Operation 210). In one or more embodiments, the association of k entity attribute vectors with specific entities involves mapping each vector back to its corresponding entity. This translates the mathematical abstraction of proximity in the n-dimensional space into tangible entities with identifiable characteristics. The identified entities correspond to recommendation data for generating a recommendation for the target entity.

Based on identifying the at least one entity attribute vector that is closest to an entity attribute vector, the system identifies the entity corresponding to the identified at least one entity attribute vector (Operation 210). For example, the system may store a mapping of entities to entity attribute vectors. The system may refer to the mapping to identify a particular entity. In an example in which the system identifies the k nearest neighbors to the entity attribute vector, the system identifies the k entities corresponding to the k nearest neighbor entity attribute vectors.

The system uses recommendation generation input data from the one or more entities to generate a recommendation for the target entity (Operation 212). For example, in the example embodiment in which a platform generates recommendations for users based on historical service usage data, the system may generate a recommendation for a target user based on service usage data of one or more other users. The one or more other users correspond to the entity attribute vectors nearest to the entity attribute vector in n-dimensional space. In an embodiment in which the system identifies k nearest neighbors to an entity attribute vector, the system generates the recommendation based on recommendation generation input data from the k nearest neighbors. In one or more embodiments, recommendation generation input data includes historical data associated with one or more actions taken by the k entities. According to one embodiment, the recommendation data includes transaction data describing one or more transactions performed by the k entities.

In one or more embodiments, the system extrapolates patterns from historical transaction data of the k entities to generate a recommendation for a target entity. For example, the system may identify a pattern in which the three nearest neighbors to a target entity purchased products A, B, and C, respectively. Based on the position in n-dimensional space of the entity attribute vector relative to the three nearest neighbors, the system may extrapolate that a product D most closely corresponds to the target entity. As an example, entity 1 may be smaller than entity 2. Entity 2 may be smaller than entity 3. Products A, B, C, and D may have a strong purchase correlation with entities of particular sizes. Accordingly, based on identifying (a) the relationship between products and entity sizes and (b) determining the target entity is larger than entity 3, the system may extrapolate that there is likely a strong correlation between the target entity and product D. Accordingly, the system may generate a recommendation to purchase product D for the target entity.

In one or more embodiments, the system uses a trained machine learning model to generate the recommendation. The system may train the machine learning model using entity data, including entity attributes and entity recommendation generation input data. For example, the system may train the machine learning model based on (a) transaction data corresponding to entities, and (b) one or more entity attributes for the entities. The system may apply the trained machine learning model to a set of input data including transaction data of a set of nearest neighbors to an entity attribute vector to generate the recommendation for the target entity.

In one or more embodiments, the system receives feedback on the recommendation by the machine learning model. The feedback may include input provided by the entity. In various embodiments, feedback may be related to the number of recommendations generated by the system, the relevancy of the recommendations, the length of time required by the recommendation engine to generate the recommendations, the presentation of the recommendations, or the inability of the machine learning models to return recommendations. Feedback may be directed to (a) the overall operation and performance of the recommendation engine or (b) to individual recommendations generated by the recommendation engine.

In one or more embodiments, feedback is considered when deciding if and how to retrain a machine learning model. For example, the dictionary may be updated to include an entity attribute for one or more entities that was not previously used, or the threshold for determining similarity of the closest entity attribute vector may be adjusted. In one or more embodiments, the preprocessing techniques are adjusted to be more inclusive or less inclusive.

In one or more embodiments, the set of recommendation data associated with the k entities includes transaction histories associated with the k entities. Generating recommendations for the target entity may include recommending at least one transaction for the target entity to perform, such as purchasing a product. However, embodiments are not limited to purchases and purchase histories. For example, embodiments encompass generating recommendations for system upgrades based on identifying vector-based similarities among computing system topologies, where a system may not have upgrade data for a target system. Embodiments encompass generating recommendations for operations to apply to a set of data based identifying vector-based similarities between a new data set and existing data sets. Operations may include, for example, structuring data in hierarchies or tables, sorting data, caching particular data from the data set, applying an algorithm to the set of data to transform the data, and storing a backup of the data.

For example, a set of enterprises may utilize an application that provides different views of stored sets of data. For example, a manager may have access to a first subset of fields of a data object, defining a first view of the data object. A technician may have access to a second subset of fields of the data object, defining a second view of the data object. A new enterprise may begin using the application. The new enterprise may not have any history of structuring its data. The system may apply the vector-based similarity determination, described above, to identify another entity that most closely matches the new entity (based on an entity attribute vector of the existing enterprise being closest in n-dimensional space to the entity attribute vector of the new enterprise). The system may identify a set of views associated with the closely-matching entity. The system may recommend to the new entity a set of views corresponding to those used by the closely-matching entity.

In one or more embodiments, a set of entity attribute vectors includes entity attributes for a target entity and entity attributes for a set of additional entities. Each entity attribute vector includes an aggregated set of entity attributes including (a) the entity attributes for the target entity, and (b) the entity attributes for each of the additional entities. In one or more alternative embodiments, the aggregated set of entity attributes includes the entity attributes for the additional entities and excludes one or more entity attributes for the target entity. For example, a system may generate a set of entity attribute vectors corresponding to a set of entities. The set of entity attribute vectors may each comprise a same set of features corresponding to an aggregated set of entity attributes for the set of entities. The system may receive a request to generate a recommendation for a target entity. The system accesses target entity attribute data. The system generates an entity attribute vector for the target entity using the target entity attribute data. The system may generate the entity attribute vector based on the set of features corresponding to the aggregated set of entity attributes. The system may not include additional features of the target entity, beyond those included in the aggregated set of entity attributes, in the entity attribute vector.

In one or more embodiments in which the aggregated set of entity attributes excludes entity attributes of the target entity, the system may train a machine learning model to predict a closest entity to the target entity based on the closest entity attribute vector to the entity attribute vector in n-dimensional space. In one or more embodiments, the system may choose a suitable supervised learning algorithm based on the characteristics of the training data or the entities to be predicted. In various embodiments, common algorithms may include, e.g., linear regression, decision trees, random forests, support vector machines, and neural networks.

In one or more embodiments, the system may train the machine learning model by splitting the training data into two or three sets: the training set, validation set, and test set. The system uses the training set to train the model. During training, the machine learning model adjusts its internal parameters to minimize an error (difference between a predicted entity and a ground truth entity corresponding to a label for the training data set) using an optimization algorithm. The specific optimization algorithm varies depending on the chosen algorithm. The system uses the validation set to tune hyperparameters of the machine learning model. Hyperparameters are settings that are not learned during training, such as, e.g., learning rate, regularization strength, number of hidden layers, etc. The system may use the validation set to test different hyperparameter configurations. The system uses the test set to evaluate the model's performance on unseen data. Common evaluation metrics include, for example, accuracy, precision, recall, F1-score (for classification tasks), and mean squared error (for regression tasks). In one or more embodiments, once trained, the system may continuously monitor the model's performance in real-world scenarios. Over time, the model's performance may degrade due to changes in the data distribution. In one or more embodiments, the model may be regularly retrained with updated data to maintain its accuracy. In one or more embodiments, if the model's performance is not satisfactory, the system may revisit the data, feature engineering, algorithm choice, and hyperparameter tuning to improve the results.

In one or more embodiments, the system receives data corresponding to an entity, including an initial or target set of one or more entity attributes. The system preprocesses the one or more entity attributes to perform at least one of: (a) remove stop words or (b) address special characters.

In one or more embodiments, the system may process the initial set of one or more entity attributes in the same manner as the sets of one or more entity attributes in the training data to generate the entity attribute vector for the initial set of one or more entity attributes. The system takes the one or more entity attributes associated with each of the entities and combines them to generate an entire dictionary vector. A count vectorizer converts the entire dictionary vector into a numerical vector representing the entity attributes for the initial set of one or more entity attributes. The count vectorizer converts the entire dictionary vector into the numerical vector. First, the count vectorizer places a "1" in each location in the entire dictionary vector that corresponds to an entity attribute that is included in the one or more entity attributes from the initial set of one or more entity attributes. Next, the count vectorizer places a "0" in each location in the entire dictionary vector that corresponds to an entity attribute that is not included in the one or more entity attributes from the initial set of one or more entity attributes. In one or more embodiments, a tf-idf transformer may calculate an updated value to represent each of the entity attributes. The tf-idf value for the one or more entity attributes replaces the "1's" in each location to create an updated entity attribute vector.

4. Generating Entity Attribute Vectors

Figure 2B:
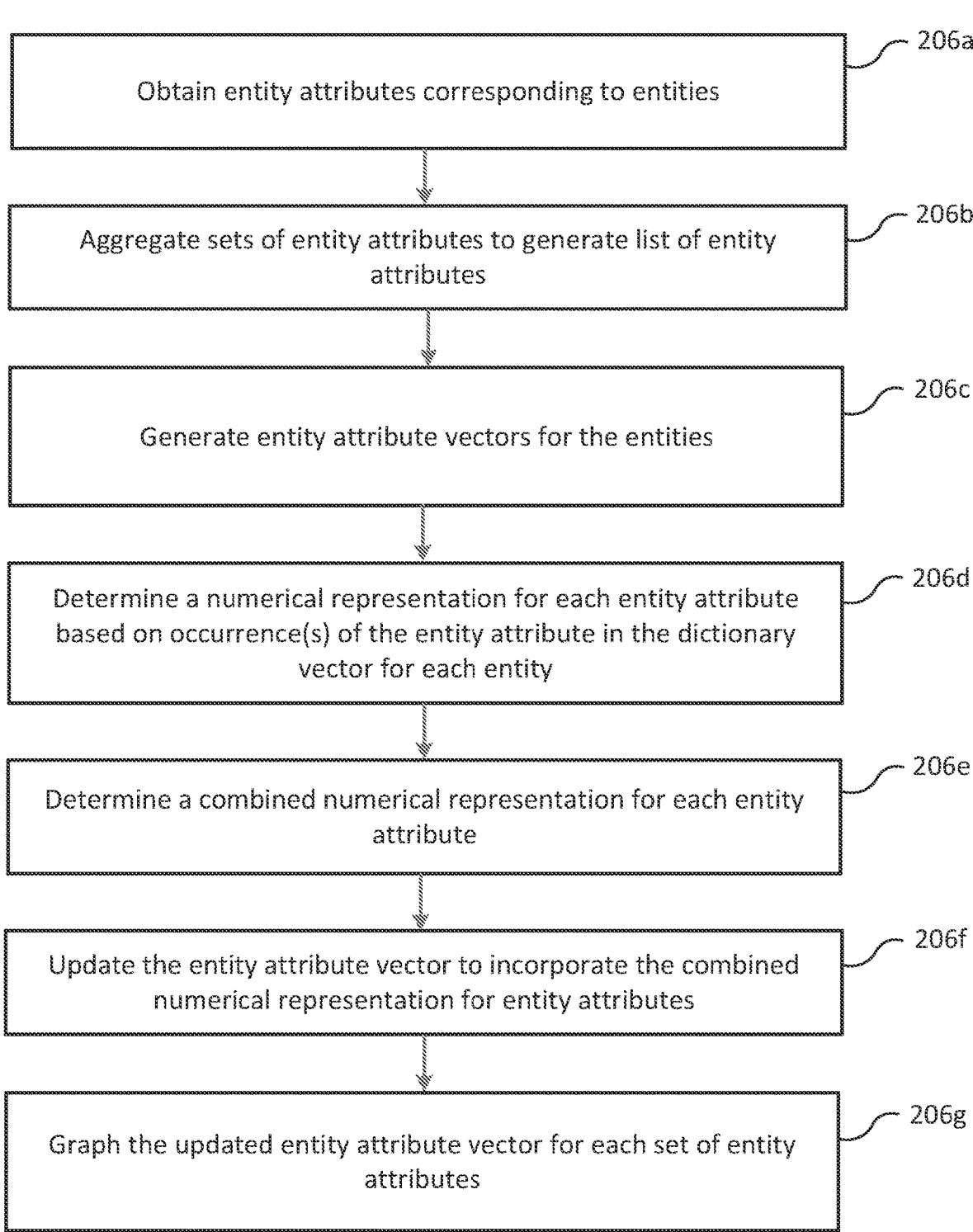
FIG. 2B illustrates an example set of operations for generating entity attribute vectors in accordance with one or more embodiments.

FIG. 2B illustrates an example set of operations for generating entity attribute vectors associated with each entity in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments.

In an embodiment, a system obtains a set of entity attributes corresponding to a target entity and a set of additional entities (Operation 206a). For example, the system may obtain one set of entity attributes corresponding to a target entity. The system may obtain multiple additional sets of entity attributes corresponding to multiple additional entities, respectively.

In one or more embodiments, entities refer to distinct elements or objects within a system for which personalized recommendations are sought. In various different embodiments, entities can take various forms depending on the application, ranging from users or organizations within a recommendation platform, products in an online marketplace, or even specific categories within a recommendation platform. For example, in the context of an online bookstore, entities could represent, for example, individual users, each book available in the inventory, and genres such as science fiction or mystery.

In one or more embodiments, entity attributes pertain to the specific characteristics or features associated with each entity. These attributes serve as the descriptive elements that define and distinguish one entity from another. Continuing with the example of an online bookstore, if the entities are individual books, the entity attributes could include, e.g., the book's genre, author, publication date, and reader ratings. For users, entity attributes might encompass, e.g., preferences, purchase history, and interaction patterns.

In one or more embodiments, entity attributes exclude recommendation generation input data (also referred to as "recommendation data"). For example, a system may be configured to generate a product recommendation for a new customer based on past purchases made by the customer. However, if a new customer creates a profile, the new customer may not have any purchase history on which to base a recommendation. The system gathers customer attribute data, including user profile data, such as a user's age, gender, region, and occupation. The customer attribute data does not include purchase history data (e.g., recommendation data), since the user does not have a purchase history.

In an embodiment, the system aggregates sets of entity attributes to generate a set of n entity attributes (Operation 206b). Aggregating the sets of entity attributes includes combining the sets of attributes associated with different entities to create a comprehensive set of n entity attributes. The comprehensive set of n entity attributes may be referred to as a "dictionary." The sets of entities include the following: (a) the target entity and (b) additional entities. In particular, the target entity is an entity for which a recommendation is requested, but which lacks data for generating the recommendation, such as a history of past transactions or past operations. The additional entities are entities that include data for generating recommendations, such as histories of past transactions or past operations. In other words, the comprehensive set of n entity attributes includes entity attributes for both the target entity and the additional entities.

In an embodiment, the system generates entity attribute vectors for the entities, including the target entity and the additional entities (Operation 206c). For each entity, the system generates an entity attribute vector representing information for one or more particular entity attributes in a particular set of entity attributes associated with the particular entity. In various embodiments, the information for the one or more particular entity attributes may comprise one or more of: (a) locations of the one or more particular entity attributes within the list of n entity attributes, (b) a term frequency (tf) of the one or more particular entity attributes in the particular set of entity attributes, or (c) an inverse document frequency (idf) of the one or more particular entity attributes in the list of n entity attributes.

One or more embodiments determine a numerical representation (e.g., term frequency tf) for each search value within its set of search values by identifying the number of occurrences of each search value within its set of search values (Operation 206d). The tf value for an entity attribute is the number of times the entity attribute appears in the set of entity attributes of an entity attribute vector associated with an entity. In embodiments, a tf-idf transformer calculates the term frequency (tf) value for each entity attribute associated with an entity. In some embodiments, this number is divided by the number of entity attributes within the set of entity attributes in an entity attribute vector associated with the entity.

One or more embodiments determine a numerical representation (e.g., inverse document frequency idf) for each entity attribute of the sets of entity attributes based on occurrence(s) of the entity attribute in the entire entity attribute vector for each entity. In some embodiments, the idf value for an entity attribute is the number of entities that include the entity attribute in the corresponding set of entity attribute values. The idf value for an entity attribute may be the logarithm of the number of entities over the number of entities that include the entity attribute in their respective set of entity attributes. The tf-idf transformer calculates the inverse document frequency (idf) value for each entity attribute within the entity attribute vector for the entity.

One or more embodiments determine a combined numerical representation for each entity attribute by combining the numerical representation for each entity attribute within its set of entity attributes and the numerical representation for occurrence(s) of each entity attribute within the entire entity attribute vector for each entity (Operation 206e). Methods for combining the tf and idf values vary. The particular method used to calculate the tf values and idf values for the search values and for combining the values is not important as long as the same method is applied consistently to all of the entity attributes. The combined tf-idf value may be computed by a multiplication operation (tf*idf). In some embodiments, the combined tf-idf value may be computed by a division operation (tf lidf). A system may use the tf value for normalization, or the logarithm of the idf value for normalization. The aim of calculating the tf-idf value is to transform the "1's" in the entity attributes into decimals, without losing the context of the data.

In one or more embodiments, the entity attribute vectors include information representing the locations of particular entity attributes within the list of n entity attributes, a term frequency (tf) value of the attributes within the specific set, and the inverse document frequency (idf) value of entity attributes within the set of entity attributes. In one or more embodiments, the locations of particular entity attributes within the set of n entity attributes provide a positional context, indicating the relevance and importance of each attribute in defining the entity. The tf value reflects the frequency of occurrence of specific attributes within the entity's set, offering insights into the attribute's prevalence. Additionally, the idf value measures the rarity of these attributes across all entities, highlighting the uniqueness of certain features associated with a particular entity.

In one or more embodiments, the system creates an entity attribute vector for each set of entity attributes that represents a location of each entity attribute of the set entity attributes within the entire set of entity attributes for the entity. A count vectorizer converts the entire set of entity attributes in an entity attribute vector for each of the entities into a numerical vector representing each of the entity attributes of the respective entities. The result of processing the entire dictionary matrix by the count vectorizer is a matrix. In the matrix, the rows correspond to the entities and the columns correspond to the entity attributes. Each location in the matrix includes a "1" or "0" depending on whether or not the entity attribute corresponding to that location is associated with the respective entity. The resulting matrix is a sparse matrix as most entities contain only a subset of the entity attributes. The matrix represents the entity attributes in a numerical format suitable for further processing by one or more machine learning models.

In an embodiment, the system updates the entity attribute vector, generated at Operation 206c, to incorporate the combined numerical representations, for entity attributes, generated at Operation 206d (Operation 206f). Specifically, the entity attribute vectors indicating the locations of the entity attributes for the one or more entity attributes of the respective entities are updated to include the combined numerical representations for each of the one or more entity attributes associated with the particular entity. Accordingly, the updated entity attribute vectors indicate both the locations of the entity attributes and the combined numerical representations determined for the entity attributes associated with the particular entity. As an example, the combined tf-idf values for each of the entity attributes in each of the entities replaces the "1" corresponding to the entity attributes for the respective entity to generate the updated vector for each entity.

In an embodiment, the system graphs the updated entity attribute vector for each set of entity attributes (Operation 206g). The system plots the updated entity attribute vectors for each set of entity attributes for later use in determining the closest entity attribute vector for an entity attribute vector as described above with relation to operation of the KNN algorithm.

5. Example Embodiment for Generating Entity Attribute Vectors

A detailed example is described below for purposes of clarity. Components and/or operations described below should be understood as one specific example that may not be applicable to certain embodiments. Accordingly, components and/or operations described below should not be construed as limiting the scope of any of the claims.

FIGS. 3A-3G illustrate an example embodiment of generating entity attribute vectors for a plurality of entities.

FIG. 3A illustrates an entity prepared dictionary. In this case, the entity is a user of a recommendation platform. The dictionary includes a list of tags/entities, and one or more entity attributes corresponding to the tags. As shown, when available, the dictionary includes a landing page for each entity. Although not shown, where available, the dictionary may further include one or more of: (a) glossary text, (b) glossary link, or (c) glossary slack, for each entity.

FIG. 3B illustrates an expanded training document. The expanded training document includes the tags from the dictionary shown in FIG. 3A and one or more entity attributes corresponding to the tags after preprocessing of the one or more entity attributes. Preprocessing includes one or more of removing stop words, converting entity attributes to lowercase, cleaning up special characters, deleting duplicate words within each set of entity attributes, lemmatizing the entity attributes, or stemming the entity attributes. For some entities, the preprocessing increased the number of entity attributes for the entity, e.g., trust-services. For other entities, the preprocessing reduced the number of entity attributes for an entity, e.g., nsit.

As seen by comparing FIGS. 3A and 3B, the entity "trust-services" went from including a single entity attribute "trust services" prior to preprocessing to a plurality of entity attributes, including "trust-services", "trustservices", "trust", "services", "service", "trust-service", "trustservic", and "service" subsequent to preprocessing. In contrast, the entity "nsit" went from having a plurality of entity attributes, including "nsit", "nsit internal", "nsit contact", "nsit landing page", "nsit ops", "nsit confluence", "nsit identity teams", "oraclenetsuite nsit", "netsuite it", "netsuite" prior to pre-processing, to a single entity attribute "nsit" subsequent to preprocessing.

FIG. 3C is a raw text matrix of the expanded training document shown in FIG. 3B. The sets of one or more entity attributes associated with each entity form a vector with a: dimension equal to the number of entity attributes. For example, the entity "nsit" forms a one-dimensional vector, and the entity "cloud-ops" forms a nine-dimensional vector. As will become evident below, the entity attributes "ops" and "op" appear in both the entity "cloud-ops" and the entity "jira".

FIG. 3D is the entire dictionary matrix, i.e., formed from all the entity attributes corresponding to each of the entities from the raw text matrix. As shown, the entire dictionary matrix includes an entire dictionary vector for each entity from the raw text matrix. Although the entity attributes in the vector are shown arranged in an order corresponding to the order that the entity attributes appear in in the entities, the entity attributes may be arranged in any order, and the order persists in the other vectors in the matrix. The raw text matrix includes 28 entity attributes, thereby forming a 28 dimensional vector.

FIG. 3E is a count vectorizer matrix, i.e., a numerical representation of the entity attributes in the entire dictionary matrix generated using a count vectorizer. Each row in the count vectorizer matrix represents an entity, and each location within a row corresponds to an entity attribute from the entire dictionary vector. As noted above, the order of the entity attributes may be different than shown and persists throughout the vectors, e.g., rows.

As illustrated in FIG. 3E, the second row, corresponding to the entity "infrastructure", includes a "1" at each of the 11th, 12th, and 13th locations in the row. These locations correspond to the entity attributes "infrastructure", "infra" and "infrastructur", respectively, i.e., the entity attributes associated with the entity "infrastructure". The second row includes a "0" at each of the $1^{st}$ to $10^{th}$ locations and at the $14^{th}$ to $28^{th}$ locations in the row, for each of these locations corresponds to an entity attribute that is not associated with the entity "infrastructure". In contrast, the fifth row, corresponding to the entity "jira", includes a "1" at each of the $5^{th}$, $10^{th}$, and $23^{rd}$ to $28^{th}$ locations in the row. These locations correspond to the entity attributes "jira", "access", "ops", "new", "project", and "op", respectively, i.e., the entity attributes associated with the entity "jira". The "1" in each of the $5^{th}$ and $25^{th}$ location in the row correspond to the entity attribute "ops", and the "1" in the $10^{th}$ and $28^{th}$ location in the row correspond to the entity attribute "op". The "0" in each of the other locations in the fifth row indicate that the entity attribute corresponding to the location is not included in the entity attributes associated with the entity "jira".

FIG. 3F is a chart identifying the tf and idf values for each of the entity attributes in the entire dictionary matrix. As noted above, there are a variety of ways of calculating individual tf and idf values and for combining, or not combining, the values to form a tf-idf value. The tf value is a numerical representation of the frequency of an entity attribute within an entity, and the idf value is a numerical representation of the frequency of an entity attribute within the document.

As shown, the tf values are calculated by counting the number of times an entity attribute appears in the entity attributes of an entity, over the number of entity attributes in the entity. For example, entity attribute "cloud-ops" appears once in the entity attributes for the entity "cloud-ops", and there are ten (10) entity attributes associated with the entity "cloud-ops". Thus, the tf value for the entity attribute "cloud-ops" is $\frac{1}{10}$. Similarly, the entity attribute "trust" appears once in the entity attributes for the entity "trust-services", and there are eight (8) entity attributes associated with the entity "trust", resulting in a tf value of $\frac{1}{8}$.

As shown, the idf values are calculated by counting the number of entities, e.g., rows, that an entity attribute appears in, over the total number of entities in the matrix. For example, the entity attribute "nsit" appears in the entity attributes of a single entity, "nsit", and there are a total of five (5) entities. Thus, the idf value for the entity attribute "nsit" is $\frac{1}{5}$. In contrast, the entity attribute "ops" appears in the entity attributes of two entities, i.e., the rows corresponding to the entities for "cloud-ops" and "jira", and there are a total of five (5) entities. Thus, the idf value for the entity attribute "ops" is $\frac{2}{5}$.

The tf and idf values may be combined in a variety of ways to produce a numerical representation of the relevance of an entity attribute within an entity to all the entities. The combined tf-idf value is a decimal number between "0" and "1". The combined tf-idf value may be calculated by multiplying the tf value by the idf value or by dividing the tf value by the idf value.

FIG. 3G is an updated matrix of the entity attributes. As shown, each of the locations in the matrix that included a "1", as being indicative of the presences of an entity attribute corresponding to the location being associated with the entity for the row is replaced by the combined tf-idf value for the entity attribute corresponding to the particular location.

6. Example Embodiment for Generating a Vector-Based Recommendation

A detailed example is described below for purposes of clarity. Components and/or operations described below should be understood as one specific example that may not be applicable to certain embodiments. Accordingly, components and/or operations described below should not be construed as limiting the scope of any of the claims.

Figure 4:
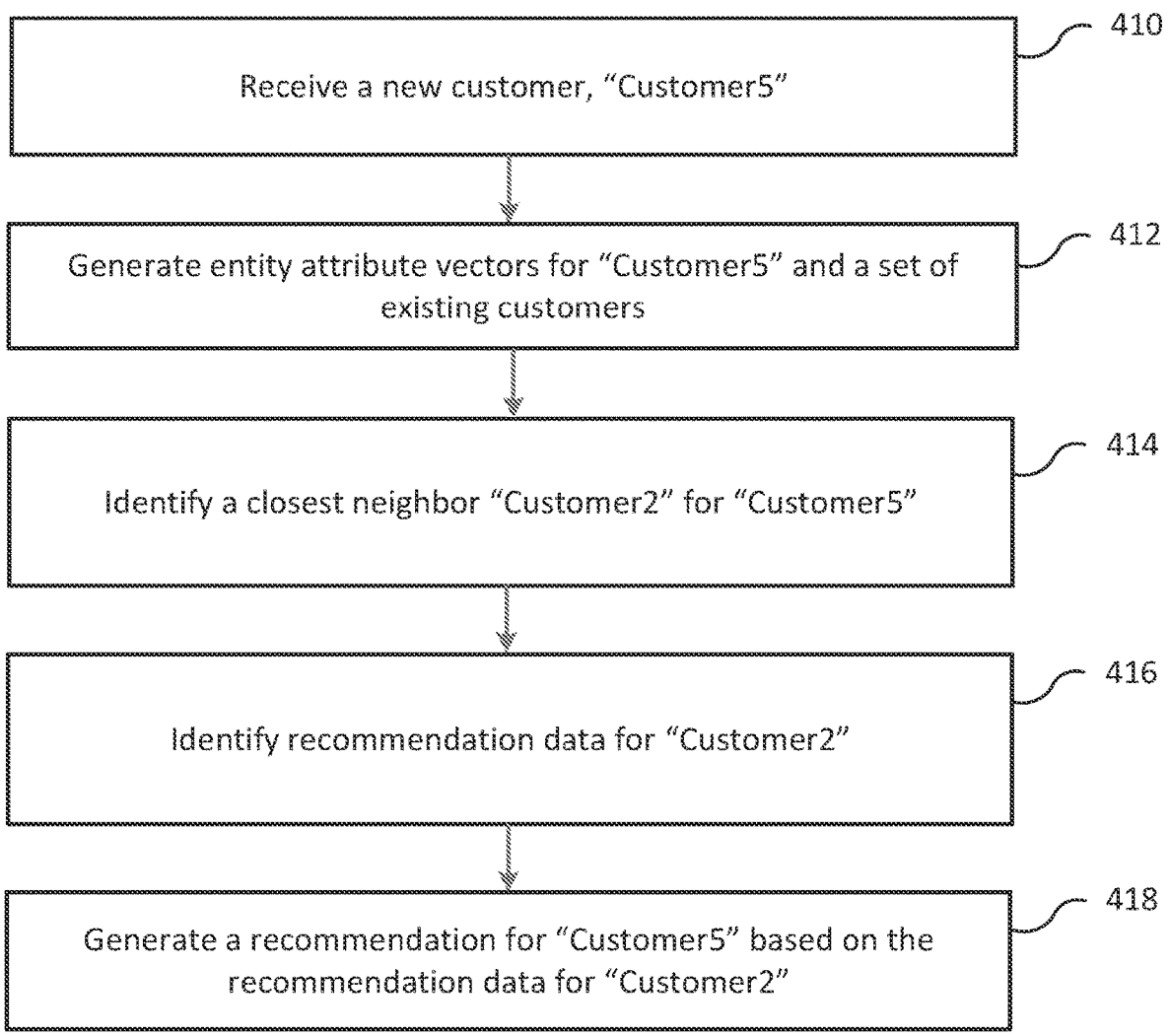
FIG. 4 illustrates an example embodiment of generating a recommendation for an entity based on determining a similarity among a set of entity attribute vectors.

FIG. 4 illustrates an example embodiment for generating a vector-based recommendation. In the example embodiment, the system, which corresponds to a platform for services, receives a new customer, "Customer 5" (Operation 410). Concurrently, the system also maintains a repository of existing customers. The system maintains data for the existing customers "Customer1" "Customer2," "Customer3," and "Customer4." The system stores data associated with the new customer the system's repository. The system obtains the data associated with the new customer via an onboarding process for the new customer.

In the example embodiment, Customer1 has a history of purchasing cloud-based services. The historical transaction data associated with Customer1 includes details like the types of cloud-based services ordered, the frequency of orders, and the transaction values. Similarly, the customer "Customer2" is associated with historical transaction data related to services for building network infrastructure.

One or more of the customers may not be associated with a data set that includes recommendation data. For example, while the system may store transaction data for Customer1, Customer2, Customer3, and Customer4, the system may not store transaction data for the new customer, Customer5. In addition, an existing customer exists, Customer6, for which the system has only one record of a historical transaction. Based on determining that a single historical transaction is insufficient for recommending a service to a new customer, the system omits Customer6 from subsequent operations to obtain recommendation data for the new customer.

The system generates customer attribute vectors for the new customer as well as the set of existing customers (Operation 412). The customer attribute vectors comprise features corresponding to a bag of words obtained from the customers' stored profiles. The customer attribute vectors all include twenty-eight features. Ten of the features correspond to Customer1 including the following: "database," "services," "provider," "ORACLE," and "enterprise." Four of the features correspond to Customer 2, including the following: "restor," "restore," "services," and "topology." Six of the features correspond to Customer3. Five of the features correspond to Customer4. Three of the features correspond to the new customer, Customer5. The system maps the entity attribute vectors to 28-dimensional space. The system performs this mapping by transforming the various attributes associated with each customer into numerical representations. The system generates the numerical representations by applying a tflidf algorithm to values for each of the features in the feature vectors.

The system identifies a vector in the 28-dimensional space that is a closest neighbor to the new customer's vector (Operation 414). In the example embodiment, the calculates a Cartesian distance between the new customer's vector and the vectors for the existing customers to determine that the vector for Customer2 is the closest to the the new customer's vector in the 28-dimensional space. In an alternative embodiment, the system identifies a closest neighbor by applying a KNN-type machine learning algorithm.

Based on determining that the vector corresponding to Customer2 is the nearest neighbor to the new customer's vector, the system retrieves historical transaction data associated with Customer2 (Operation 416). The historical transaction data for Customer2 includes the following services: "cloud services suite subscription," "database upgrade," and "media server upgrade."

The system generates a recommendation for a transaction to be presented to Customer5 based on the historical transaction data for Customer2 (Operation 418). In this example embodiment, the system generates a notification for a client services employee performing an onboarding of Customer5. The notification includes the following: "Customer5 appears to have similar requirements as existing Customer2. Would Customer5 be interested in a cloud services suite subscription?" The client services employee may contact Customer5 to determine whether the customer would like to purchase the recommended services. In alternative embodiments, the system may generate notifications, such as an instant message, a text message, an email, or a chat bubble in a web browser, to recommend the cloud services suite subscription to the new customer.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
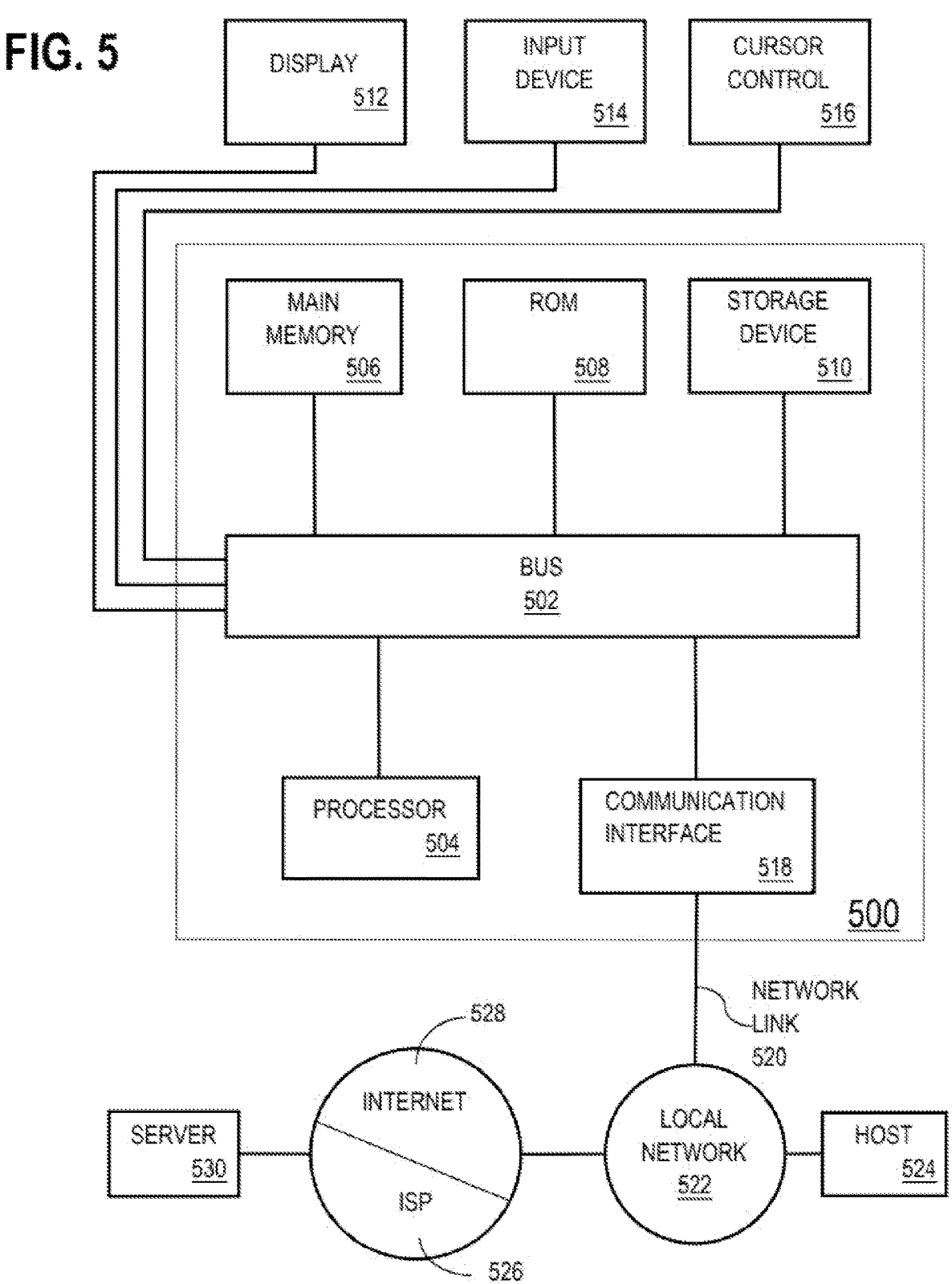
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer entity. An input device 514, including alphanumeric and other keys, is coupled to bus 502 for communicating information and command selections to processor 504. Another type of entity input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-address-able memory (TCAM).

Storage media is distinct from but may be used in con-junction with transmission media. Transmission media par-ticipates in transferring information between storage media. For example, transmission media includes coaxial cables, copper wire and fiber optics, including the wires that com-prise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may ini-tially be carried on a magnetic disk or solid state drive of a remote computer. The remote computer can load the instruc-tions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of tele-phone line. As another example, communication interface 518 may be a local area network (LAN) card to provide a data communication connection to a compatible LAN. Wire-less links may also be implemented. In any such implemen-tation, communication interface 518 sends and receives electrical, electromagnetic or optical signals that carry digi-tal data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electro-magnetic or optical signals that carry digital data streams. The signals through the various networks and the signals on network link 520 and through communication interface 518that carry the digital data to and from computer system 500, are example forms of transmission media.

Computer system 500 can send messages and receive data, including program code, through the network(s), net-work link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes per-formance of any of the operations described herein and/or recited in any of the claims.

Any combination of the features and functionalities described herein may be used in accordance with one or more embodiments. In the foregoing specification, embodi-ments have been described with reference to numerous specific details that may vary from implementation to imple-mentation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of opera-tions comprising:

obtaining a plurality of sets of entity attributes, wherein each set of entity attributes, of the plurality of sets of entity attributes, corresponds to a respective entity of a plurality of entities;

aggregating the entity attributes in the plurality of the sets of entity attributes to generate a list of n entity attri-butes;

generating a plurality of entity attribute vectors for the plurality of entities, respectively, at least by:

for each particular entity of the plurality of entities, generating a particular entity attribute vector repre-senting information for one or more particular entity attributes in a particular set of entity attributes asso-ciated with the particular entity, wherein the infor-mation for the one or more particular entity attributes comprises one or more of:

(a) locations of the one or more particular entity attributes within the list of n entity attributes, (b) a term frequency (tf) of the one or more particular entity attributes in the particular set of entity attributes, or (c) an inverse document frequency (idf) of the one or more particular entity attributes in the list of n entity attributes;

determining a target entity is associated with insufficient recommendation data for generating a recommendation for the target entity;

responsive to determining the target entity is associated with insufficient recommendation data, generating a recommendation for the target entity based on recommendation data of one or more additional entities at least by:

identifying an entity attribute vector for the target entity;

identifying k entity attribute vectors, of the plurality of entity attribute vectors, that are closest to the entity attribute vector; and identifying k entities, of the plurality of entities, that correspond to the k entity attribute vectors; and generating the recommendation for the target entity based on a set of recommendation data associated with the k entities.

2. The one or more non-transitory computer readable media of claim 1, wherein the entity attribute vector is comprised in the plurality of entity attribute vectors, and wherein a target set of entity attributes, corresponding to the target entity, is comprised in the plurality of sets of entity attributes.

3. The one or more non-transitory computer readable media of claim 1, wherein the operations further comprise computing the entity attribute vector at least by:

receiving a first set of entity attributes corresponding to the target entity, the first set of entity attributes comprising one or more target entity attributes corresponding to the target entity; and computing the entity attribute vector to represent information for the first set of entity attributes, wherein the information for the first set of entity attributes comprises one or more of:

(a) locations of the one or more target entity attributes within the list of n entity attributes, (b) a term frequency (tf) of the one or more target entity attributes in the first set of entity attributes, or (c) an inverse document frequency (idf) of the one or more target entity attributes in the list of n entity attributes.

4. The one or more non-transitory computer readable media of claim 1, wherein the operations of (a) obtaining the plurality of sets of entity attributes, (b) aggregating the entity attributes, and (c) generating the plurality of entity attribute vectors are performed responsive to determining the target entity is associated with insufficient data for generating the recommendation for the target entity.

5. The one or more non-transitory computer readable media of claim 1, wherein the set of data associated with the k entities comprises transaction histories associated with the k entities, and wherein generating the recommendation for the target entity comprises recommending at least one transaction for the target entity to perform.

6. The one or more non-transitory computer readable media of claim 1, wherein identifying the k entity attribute vectors that are closest to the entity attribute vector comprises:

plotting the plurality of entity attribute vectors in n dimensional space; and determining a distance between the entity attribute vector and the k entity attribute vectors in the n dimensional space.

7. The one or more non-transitory computer readable media of claim 1, the operations comprise:

generating training data for training a K-Nearest Neighbor (KNN) machine learning model to determine a closest match to a particular entity attribute vector based on the plurality of entity attribute vectors;

training the KNN machine learning model using the training data; and applying the KNN machine learning model to the entity attribute vector to determine the k entity attribute vectors that are closest to the entity attribute vector.

8. A method comprising:

obtaining a plurality of sets of entity attributes, wherein each set of entity attributes, of the plurality of sets of entity attributes, corresponds to a respective entity of a plurality of entities;

aggregating the entity attributes in the plurality of the sets of entity attributes to generate a list of n entity attributes;

generating a plurality of entity attribute vectors for the plurality of entities, respectively, at least by:

for each particular entity of the plurality of entities, generating a particular entity attribute vector representing information for one or more particular entity attributes in a particular set of entity attributes associated with the particular entity, wherein the information for the one or more particular entity attributes comprises one or more of:

(a) locations of the one or more particular entity attributes within the list of n entity attributes, (b) a term frequency (tf) of the one or more particular entity attributes in the particular set of entity attributes, or (c) an inverse document frequency (idf) of the one or more particular entity attributes in the list of n entity attributes;

determining a target entity is associated with insufficient recommendation data for generating a recommendation for the target entity;

responsive to determining the target entity is associated with insufficient recommendation data, generating a recommendation for the target entity based on recommendation data of one or more additional entities at least by:

identifying an entity attribute vector for the target entity;

identifying k entity attribute vectors, of the plurality of entity attribute vectors, that are closest to the entity attribute vector; and identifying k entities, of the plurality of entities, that correspond to the k entity attribute vectors; and generating the recommendation for the target entity based on a set of recommendation data associated with the k entities.

9. The method of claim 8, wherein the entity attribute vector is comprised in the plurality of entity attribute vectors, and wherein a target set of entity attributes, corresponding to the target entity, is comprised in the plurality of sets of entity attributes.

10. The method of claim 8, further comprising computing the entity attribute vector at least by:

receiving a first set of entity attributes corresponding to the target entity, the first set of entity attributes comprising one or more target entity attributes corresponding to the target entity; and computing the entity attribute vector to represent infor-
mation for the first set of entity attributes, wherein the
information for the first set of entity attributes com-
prises one or more of:
  (a) locations of the one or more target entity attributes
    within the list of n entity attributes,
  (b) a term frequency (tf) of the one or more target entity
    attributes in the first set of entity attributes, or
  (c) an inverse document frequency (idf) of the one or
    more target entity attributes in the list of n entity
    attributes.

11. The method of claim 8, further comprising:
wherein the operations of (a) obtaining the plurality of
  sets of entity attributes, (b) aggregating the entity
  attributes, and (c) generating the plurality of entity
  attribute vectors are performed responsive to determin-
  ing the target entity is associated with insufficient data
  for generating the recommendation for the target entity.

12. The method of claim 8, wherein the set of data
associated with the k entities comprises transaction histories
associated with the k entities, and wherein generating the
recommendation for the target entity comprises recommend-
ing at least one transaction for the target entity to perform.

13. The method of claim 8, wherein identifying the k
entity attribute vectors that are closest to the entity attribute
vector comprises:
  plotting the plurality of entity attribute vectors in n
    dimensional space; and
  determining a distance between the entity attribute vector
    and the k entity attribute vectors in the n dimensional
    space.

14. The method of claim 8, further comprising:
generating training data for training a K-Nearest Neighbor
  (KNN) machine learning model to determine a closest
  match to a particular entity attribute vector based on the
  plurality of entity attribute vectors;
training the KNN machine learning model using the
  training data; and
applying the KNN machine learning model to the entity
  attribute vector to determine the k entity attribute
  vectors that are closest to the entity attribute vector.

15. A system comprising:
one or more processors; and
memory storing instructions that, when executed by the
  one or more processors, cause the system to perform:
obtaining a plurality of sets of entity attributes,
wherein each set of entity attributes, of the plurality of
  sets of entity attributes, corresponds to a respective
  entity of a plurality of entities;
aggregating the entity attributes in the plurality of the sets
  of entity attributes to generate a list of n entity attri-
  butes;
generating a plurality of entity attribute vectors for the
  plurality of entities, respectively, at least by:
    for each particular entity of the plurality of entities,
      generating a particular entity attribute vector repre-
      senting information for one or more particular entity
      attributes in a particular set of entity attributes asso-
      ciated with the particular entity, wherein the infor-
      mation for the one or more particular entity attributes
      comprises one or more of:
        (a) locations of the one or more particular entity
          attributes within the list of n entity attributes,
        (b) a term frequency (tf) of the one or more particular
          entity attributes in the particular set of entity
          attributes, or (c) an inverse document frequency (idf) of the one or
    more particular entity attributes in the list of n
    entity attributes;
determining a target entity is associated with insufficient
  recommendation data for generating a recommendation
  for the target entity;
responsive to determining the target entity is associated
  with insufficient recommendation data, generating a
  recommendation for the target entity based on recom-
  mendation data of one or more additional entities at
  least by:
    identifying an entity attribute vector for the target
      entity;
    identifying k entity attribute vectors, of the plurality of
      entity attribute vectors, that are closest to the entity
      attribute vector; and
    identifying k entities, of the plurality of entities, that
      correspond to the k entity attribute vectors; and
  generating the recommendation for the target entity based
    on a set of recommendation data associated with the k
    entities.

16. The system of claim 15, wherein the entity attribute
vector is comprised in the plurality of entity attribute vec-
tors, and wherein a target set of entity attributes, correspond-
ing to the target entity, is comprised in the plurality of sets
of entity attributes.

17. The system of claim 15, wherein the memory stores
instructions that further cause the system to perform com-
puting the entity attribute vector at least by:
  receiving a first set of entity attributes corresponding to
    the target entity, the first set of entity attributes com-
    prising one or more target entity attributes correspond-
    ing to the target entity; and
  computing the entity attribute vector to represent infor-
    mation for the first set of entity attributes, wherein the
    information for the first set of entity attributes com-
    prises one or more of:
      (a) locations of the one or more target entity attributes
        within the list of n entity attributes,
      (b) a term frequency (tf) of the one or more target entity
        attributes in the first set of entity attributes, or
      (c) an inverse document frequency (idf) of the one or
        more target entity attributes in the list of n entity
        attributes.

18. The system of claim 15, wherein the memory stores
instructions that further cause the system to perform:
  wherein the operations of (a) obtaining the plurality of
    sets of entity attributes, (b) aggregating the entity
    attributes, and (c) generating the plurality of entity
    attribute vectors are performed responsive to determin-
    ing the target entity is associated with insufficient data
    for generating the recommendation for the target entity.

19. The system of claim 15, wherein the set of data
associated with the k entities comprises transaction histories
associated with the k entities, and wherein generating the
recommendation for the target entity comprises recommend-
ing at least one transaction for the target entity to perform.

20. The system of claim 15, wherein identifying the k
entity attribute vectors that are closest to the entity attribute
vector comprises:
  plotting the plurality of entity attribute vectors in n
    dimensional space; and
  determining a distance between the entity attribute vector
    and the k entity attribute vectors in the n dimensional
    space.

* * * * *